United States Patent [19]

Simms

[11] Patent Number: 4,916,579

[45] Date of Patent: Apr. 10, 1990

[54] GRADIENT INDEX ZOOM ILLUMINATOR

[75] Inventor: Robert A. Simms, Phoenix, Ariz.

[73] Assignee: Murasa International, Long Beach, Calif.

[21] Appl. No.: 301,596

[22] Filed: Jan. 26, 1989

[51] Int. Cl.⁴ .............................................. G03B 15/02
[52] U.S. Cl. ....................................... 362/18; 362/61; 362/187; 362/259; 362/319
[58] Field of Search ....................... 362/3, 16, 18, 187, 362/259, 280, 311, 319, 800, 61, 80

[56] References Cited

U.S. PATENT DOCUMENTS

| | | | |
|---|---|---|---|
| 4,141,059 | 2/1979 | Shiojiri | 362/18 |
| 4,185,891 | 1/1980 | Kaestner | 362/259 X |
| 4,293,892 | 10/1981 | Plummer | 362/18 X |

Primary Examiner—Stephen F. Husar
Attorney, Agent, or Firm—LaValle D. Ptak

[57] ABSTRACT

A gradient index zoom illuminator which may be used for visible or infrared illumination comprises a housing which has a light exit opening in it. A point or collimated light source is mounted in the housing. A gradient index lens, having a central axis, also is mounted in the housing between the light source and the light exit opening in the housing; and the light source is located on the axis of the lens. Focusing of the light exiting from the light exit opening of the housing is accomplished by changing the relative distance between the light source and the gradient index lens to vary the beam of emitted light from a maximum divergence to to a narrow collimated beam.

20 Claims, 1 Drawing Sheet

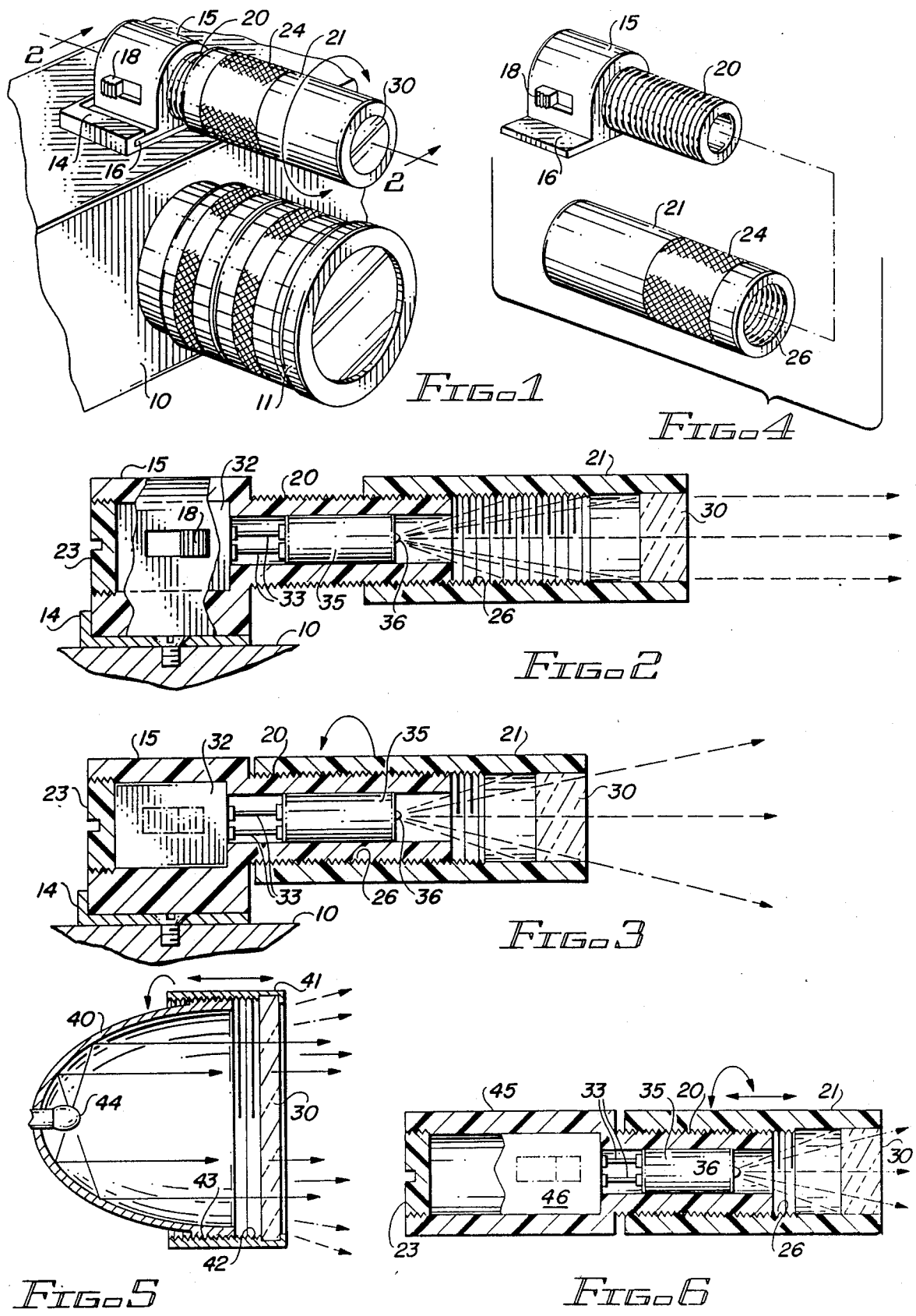

GRADIENT INDEX ZOOM ILLUMINATOR

BACKGROUND

Many applications exist for high intensity illuminators which are capable of producing a field of illumination which varies from a narrow field to a relatively wide field. Some such applications require the capability of varying such a field in different increments from narrow to wide or simply switch between a narrow field and a wide one.

One such application is an image enhancement device for utilization with infrared image intensifiers used in night vision equipment. Night vision direct view image intensifiers generally are found in two distinct classes. One class, with no amplification, is referred to as generation zero or as a component of generation one devices. The second class, with inherent amplification, is referred to as a generation two device. There is a generation three device, but as far as this discussion is concerned, generation three devices are no different from generation two devices. Generation zero and generation one devices have optical gains limited to magnitudes of about one-hundred (100). Therefore, if such devices are to be used in a dark environment, they need to be coupled together; so that the individual optical gains may be multiplied. Such a coupling results in a bulky, awkward and expensive device. Generation two devices, because of the inherent amplification, may have optical gains in the thousands and thus, generation two devices are very useful for night vision environments. However, even though generation two devices are much less bulky and awkward than coupled generation zero or one devices, generation two devices are very expensive. To permit the utilization of generation zero or generation one devices in low light environments, some type of illuminator or light enhancement is necessary.

Another area where high intensity visible light of variable width fields is useful is in conjunction with camera flash units. Most camera flash devices which currently are marketed, have a fixed and relatively wide light spread for the light emanating from the flash unit. Capacitor discharge circuits are employed for providing power to a high intensity flash lamp in popular electronic flash devices currently employed with most modern cameras. Such flash devices either are provided as add-on units for the camera or now are built into the camera. Older flash units employ flashbulbs and reflectors. In such units the flashbulb is expended each time a flash picture is taken. The reflectors typically have a fixed shape for a relatively wide angle reflection of the light from the flashbulb.

Another application of varying light focus is found in automobile headlights. Typically, automobile headlights are provided with a "low" beam and a "high" beam mode of operation. For some headlights, the two functions are combined in a single lamp; and the beam location is varied in accordance with the location of the beam filaments with respect to the reflector to provide either the high or low beam illumination from the head lamp. In many automobile headlight systems, two separate pairs of lamps are provided. The "low" beam lamp set is focused at a first range or spread of light and the second "high" beam lamp set is focused for a different range and illumination spread. The headlight systems are operated in the same manner by the operator of the automobile who simply selects one or the other of the two different modes of operation through the manipulation of a selection switch.

High intensity light emitting devices, such as laser diodes and the like, presently are well known and are utilized in many applications. Such devices are relatively small and operate on a low amounts of power. The light intensity of laser diodes operating both in the visible and infrared spectrums is high; so that if a lens system is devised which is capable of dispersing or spreading the narrow beam of light from a laser light source, illumination at different angles may be achieved. It is desirable to provide such a system which is capable of changing the illumination from a high intensity light source, such as a laser light source, from a narrow collimated beam to a wide uniform beam. Additionally, it is desirable to provide such a system which is self focusing throughout the range from the narrowest beam to the widest beam obtainable.

SUMMARY OF THE INVENTION

It is an object of this invention to provide an improved light system.

It is another object of this invention to provide an improved laser light system.

It is an additional object of this invention to provide an improved zoom illuminator.

It is a further object of this invention to provide an improved gradient index zoom illuminator.

It is also an additional object of this invention to provide an improved portable laser zoom illuminator.

In accordance with a preferred embodiment of this invention, a gradient index zoom illuminator consists of a housing which has a light exit opening in it. A gradient index lens, which has a central axis through it, is mounted in the housing between a point light source and the light exit opening in the housing. The light source is located on the axis of the lens. A power supply is provided and a switch selectively interconnects and disconnects the light source and the power supply. Apparatus is provided for changing the relative distance between the light source and the lens to change the focus of light exiting from the light exit opening in the housing from a maximum divergence to a collimated beam of light.

BRIEF DESCRIPTION OF THE DRAWING

FIG. 1 is a perspective view of a preferred embodiment of the invention in one of the applications with which it may be used;

FIGS. 2 and 3 are cross-sectional views along the line 2—2 of FIG. 1 showing the embodiment in two different conditions of operation;

FIG. 4 is an exploded perspective view of the embodiment shown in FIG. 1;

FIG. 5 is a cross-sectional view of an alternative embodiment of the invention; and FIG. 6 is a cross-sectional view, similar to the view of FIGS. 2 and 3, illustrating another embodiment of the invention.

DETAILED DESCRIPTION

Reference now should be made to the drawings in which the same reference numbers are used throughout the different figures to designate the same components. FIG. 1 illustrates a preferred embodiment of the invention used as a flash unit on a camera 10. A portion of the body of the camera 10 is illustrated and the camera lens 11 also is shown. This illustration is typical of 35MM cameras of the type which currently are in wide-spread use. Such cameras typically have a flash gun socket 14 located on the top and which is interconnected to the shutter release mechanism for operating a flash gun or flash unit placed in the socket. Typical flash units have a mating flange 16 on them for insertion into the socket 14. In place of a standard flash unit, a preferred embodiment of the invention in the form of a gradient index zoom illuminator, having a body 15 is illustrated. The illuminator 15 has outwardly extending flanges 16 on each side of it for engagement in the socket 14. Interconnections through the socket 14 to the circuitry within the unit 15 are provided in the standard manner. In addition, the unit 15 has an on/off switch 18 located in it to disable the unit when it is not to be used.

In place of a standard electronic flash gun, the unit 15 has an inner barrel 20 and an outer barrel 21 mounted for telescoping motion with respect to one another. The inner barrel 20 is externally threaded, as illustrated most clearly in FIG. 4; and the outer barrel 21 is internally threaded to mate with the threads on the barrel 20, as shown most clearly in FIGS. 2 and 3. The two barrels are cylindrical and co-axial. The outer or right-hand end of the barrel 21 has a gradient index lens 30 mounted in it. The barrel 21 otherwise is hollow.

The barrel 20 has a laser diode operating circuit 35 in it with a laser diode 36 located on the central axis through the two parts 20 and 21 of the unit. The location of the diode 36 is illustated most clearly in FIGS. 2 and 3. The circuitry 35 for operating the diode 36 is conventional, and for that reason, no details have been shown. This is direct current circuitry for operating a low voltage diode 36, and the two connecting leads 33 for operating this circuitry extend from the left-hand end of the circuitry 35, as shown in FIGS. 2 and 3, to a battery 32, constituting the power supply in the housing 15. The battery 32 is of any conventional type, such as a 9 volt battery popular for operating a variety of portable electronic devices.

Access to the interior of the housing 15 for the purpose of replacing the battery 32 is provided by an end cap 23, which is illustrated as a threaded cap for closing the left-hand end of the housing 15. Suitable springs, not shown, may also be included for ensuring contact of the terminals of the battery 32 with corresponding mating terminals interconnected with the leads 33. The switch 18 also is connected in series circuit with the battery to provide the desired on/off master power control for the diode circuit 35. The interconnections of the switch 18 with the circuit between the battery and the leads 33 have not been shown, but are standard series switch circuit interconnections. The control for operating the circuitry as a flash unit is completed through the conventional switch contacts provided for this purpose by the camera 10.

A primary difference between the system shown in FIGS. 1 through 4 and a standard electronic flash, however, is the capability of the unit illustrated in FIGS. 1 through 4 of being utilized to vary the spread or focus of the light emanating through the gradient index lens 30 to the object to be illuminated. In a gradient index lens, the refractive index of the lens material varies parabolically as a function of its radius. As a result of such index variation, any ray incident on the front surface (the left surface shown in FIGS. 2 and 3) follows a sinusoidal path along the lens rod. The period of this sinusoidal path is called the "pitch" of the lens. This period is the same for all of the incident rays. Knowing the pitch of a gradient lens, it is possible to achieve various imaging characteristics simply by varying the length of the lens. When a gradient index lens, such as the lens 30, is used for collimating a laser diode, the length of the lens (from left to right, as viewed in FIGS. 2 and 3) is selected to be slightly less than a quarter of a pitch. As illustrated in FIG. 2, at a selected distance of the light source diode 36 from the left (front) surface of the lens, all of the rays which emanate from the point source laser diode (or other suitable point source of light) traverse the lens 30 and become collimated. This is illustrated by the parallel dotted lines shown emanating from the right-hand or rear surface of the lens 30, as illustrated in FIG. 2.

If, as illustrated in FIG. 3, the relative distance between the point source of light 36 and the front (left-hand surface) of the lens 30 is made closer than illustrated in FIG. 2, the lens 30 causes the beam which exits from the rear surface to become divergent. Thus, when the cylinder 31 is rotated about the portion 20 to move the lens 30 from the position shown in FIG. 2 to the position shown in FIG. 3, a gradual increase in the spread or degree of divergence of the light rays exiting from the lens 30 is produced. The light beam attains its maximum width in the close position of the diode 36 to the lens 30, as illustrated in FIG. 3.

The relative distances which are shown in FIGS. 2 and 3 of the drawing are greatly exaggerated for purposes of illustrating the principles of the invention. In actual practice, the total distance of movement from the position of FIG. 2, for example, to the position of FIG. 3 is of the order of tenths of inches for a typical laser diode capable of use in a flash unit. The divergence which occurs between the two positions shown in FIGS. 2 and 3 provides a "zoom" effect which causes the beam of light which emanates from the laser diode 36 to vary uniformly as a function of the movement. As illustrated, the lens 30 simply is encased in a threaded cylinder 21 which may be turned in either direction to screw it into or out of a mating housing containing the laser diode. The cylinder 21 could be externally threaded, with the cylinder 20 being internally threaded, to reverse the relationship of the parts shown without changing the function.

Ideally, the lens 30 is a micro lens of a type presently commercially available and sold under the trademark SELFOC produced by Nippon Sheet Glass Company of Tokyo, Japan. This lens is distributed by NSG America, Inc. Such micro lenses perform optical functions similar to standard spherical lenses, but have an added benefit in that the end surfaces are flat. Consequently, such lenses do not require the precision grinding, alignment, etc. which is necessary for standard glass optical lens construction.

By utilizing a high intensity laser diode 36, producing white light in the visible spectrum, the device shown in FIGS. 1 through 4 may be substituted for a standard electronic flash unit in a camera. The focusing of the lens 21 to produce the desired degree of divergence, may be manual and independent of the focusing of the optical lens of the camera. In the alternative, however, the focusing of the unit shown in FIGS. 1 through 4 may be coupled to the camera focusing to provide varying degrees of spread of the light from the diode 36 in accordance with the setting of the distance focus of the camera itself. Such a coupling may be achieved in any conventional fashion.

FIG. 5 illustrates another variation of the invention which may be employed to change the focus of an automobile head lamp, for example from a "low beam" to a "high beam" configuration as desired. As illustrated in FIG. 4, a typical parabolic reflector 40 of the type used in automobile head lamps is provided with a bulb 44 located at its focal point. The reflector 40 may be selected to cause the light produced by the bulb 44 to be reflected outwardly toward the right hand or open end of the reflector as a collimated set of parallel light beams. The end of the reflector 44, however, is provided with an externally threaded section 43 for engaging the internally threaded section 42 of a ring-like cylindrical section 41 which has a gradient index lens 30 mounted in it. By rotating the section 41 in either direction about the threaded section 43, the lens 30 is moved toward and away from the light bulb 43. The device initially may be set to cause the lens 30 to be located at the position for providing parallel beams of light or near parallel beams of light from the output of the head lamp assembly. This corresponds to the "low-beam" state of operation. Operation of the high-beam switch by the vehicle operator, then may be utilized to provide a preset rotation, through an electric motor and interconnecting gears (not shown), to move the lens 30 closer to the bulb 44. The lens then produces the maximum dotted line divergence which is illustrated in FIG. 6. This corresponds to a "high-beam" position of the head lamp. In contrast to conventional "low-beam/high-beam" two-position head lamp systems, however, the device of FIG. 5 may also incorporate intermediate beam divergence, if desired. This provides for a greater degree of flexibility and operating characteristics than presently are attainable with conventional automobile head lamp systems.

FIG. 6 illustrates a variation of the embodiment of FIGS. 1 through 4, but incorporates the device in the form of a portable flashlight or the like. The components of FIGS. 6 which are the same or similar to those of FIGS. 1 through 4 are provided with identical reference numbers. The main body portion, however, in the device of FIG. 6 is an elongated, cylindrical section 45 which has a battery power supply 46 located in it. The cylindrical section 45 is closed by the threaded cap 23 in the same manner of the device shown in FIGS. 1 through 4. The device of FIG. 6 is suited for use as a flashlight. The laser diode 36 may either be one which produces light in visible wavelength regions or in infrared regions, as desired.

Various changes and modifications will occur to those skilled in the art without departing from the true scope of this invention. For example, while the light source has been specifically described as a laser light source, high intensity light sources of different types may be employed in accordance with the desired operating characteristics of the device. Such light source may be of any suitable wavelengths, both in the visible and infrared regions. Gradient index lenses which essentially comprise fiber optic wave guides of various types may be employed for the lens 30. The particular configurations of the mechanical apparatus for effecting the movement of the lens 30 toward and away from the light source, also may be varied without departing from the true scope of the invention, as defined in the appended claims.

I claim:

1. A gradient index zoom illuminator including in combination:
   a housing having a light exit opening therein;
   a light source mounted in said housing;
   a power supply;
   switch means selectively interconnecting and disconnecting said light source and said power supply;
   a gradient index lens means having a central axis and mounted in said housing between said light source and the light exit opening in said housing, said light source located on the axis of said lens means; and
   means for changing the relative distance between said light source and said lens to change the focus of light exiting from said light exit opening in said housing from a predetermined maximum divergence to a collimated beam of light produced by said light source.

2. The combination according to claim 1 wherein said power supply is a battery power supply.

3. The combination according to claim 2 wherein said power supply and said switch means are located in said housing.

4. The combination according to claim 3 wherein said housing is a substantially cylindrical housing with the light exit opening located in one end thereof.

5. The combination according to claim 4 wherein said light source is a solid state laser light source.

6. The combination according to claim 5 wherein said gradient index lens means comprises a cyindrical micro lens of gradient index material.

7. The combination according to claim 6 wherein said lens means has a first end located adjacent said light source and a second end located adjacent said light exit opening, and wherein said means for changing the relative distance between said light source and said lens means changes the distance between said first end of said lens means and said light source.

8. The combination according to claim 7 wherein said housing comprises a cylindrical housing with at least first and second telescoping parts, said parts being axially movable with respect to one another; said light source located in said first part and said lens means located in said second part for axial movement therewith toward and away from said light source.

9. The combination according to claim 8 wherein light source is an infrared light source.

10. The combination according to claim 1 wherein said housing include a reflector located on one side of said light source and wherein said lens means is located on an opposite side of said light source.

11. The combination according to claim 10 wherein said reflector comprises a parabolic reflector and said housing comprises an automobile head lamp housing.

12. The combination according to claim 11 wherein said lens means has a first end located adjacent said light source and a second end located adjacent said light exit opening, and wherein said means for changing the relative distance between said light source and said lens means changes the distance between said first end of said lens means and said light source.

13. The combination according to claim 12 wherein said gradient index lens means comprises a cylindrical micro lens of gradient index material.

14. The combination according to claim 1 wherein said housing is a substantially cylindrical housing with the light exit opening located in one end thereof.

15. The combination according to claim 14 wherein said light source is a solid state laser light source.

16. The combination according to claim 1 wherein said light source is an infrared light source.

17. The combination according to claim 1 wherein said gradient index lens means comprises a cylindrical micro lens of gradient index material.

18. The combination according to claim 1 wherein said light source is a solid state laser light source.

19. The combination according to claim 1 wherein said housing comprises a cylindrical housing with at least first and second telescoping parts, said parts being axially movable with respect to one another; said light source located in said first part and said lens means located in said second part for axial movement therewith toward and away from said light source.

20. The combination according to claim 1 wherein said lens means has a first end located adjacent said light source and a second end located adjacent said light exit opening, and wherein said means for changing the relative distance between said light source and said lens means changes the distance between said first end of said lens means and said light source.

* * * * *